Oct. 11, 1932.  W. GANZ  1,881,467
LOCK DEVICE
Filed Dec. 23, 1927   2 Sheets-Sheet 1
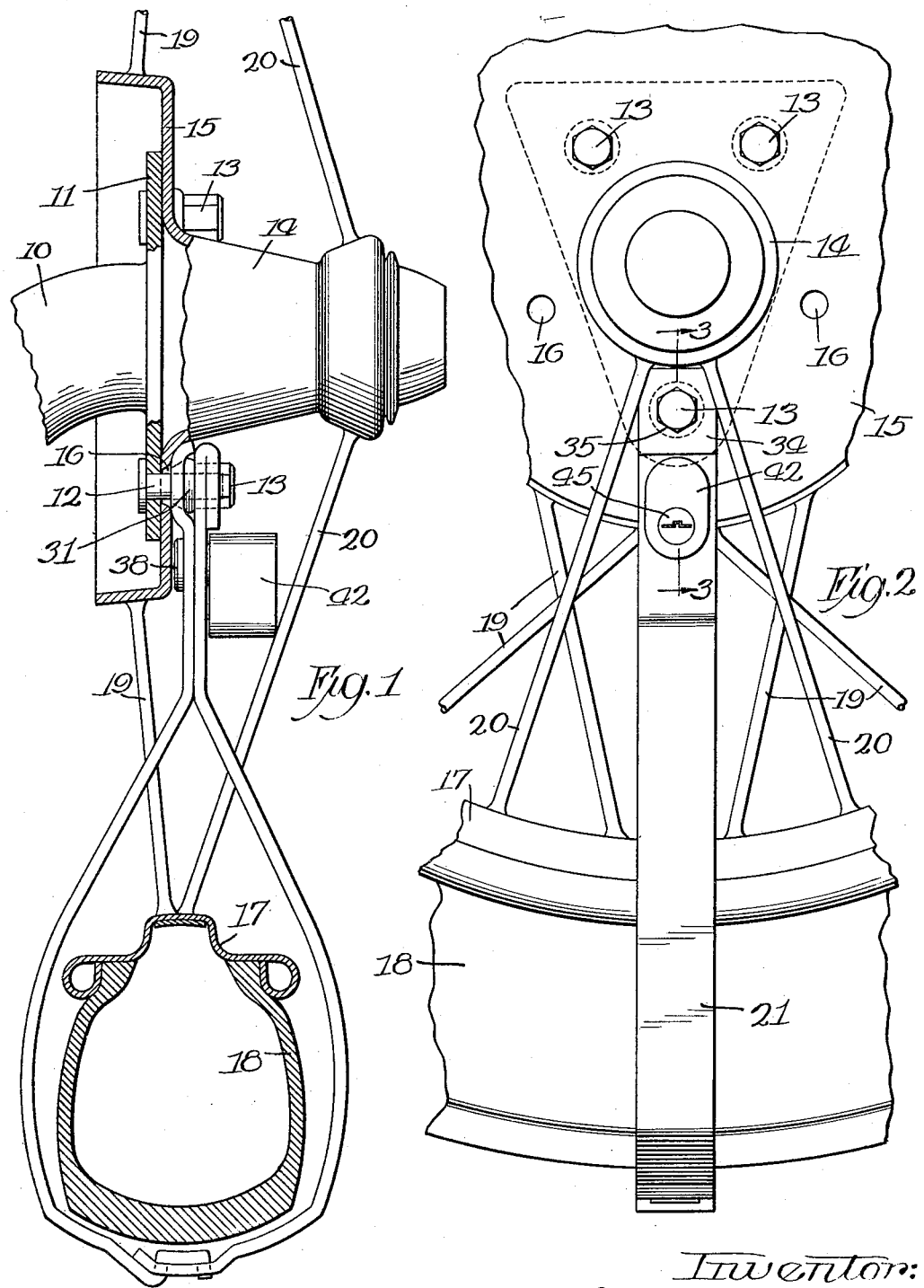

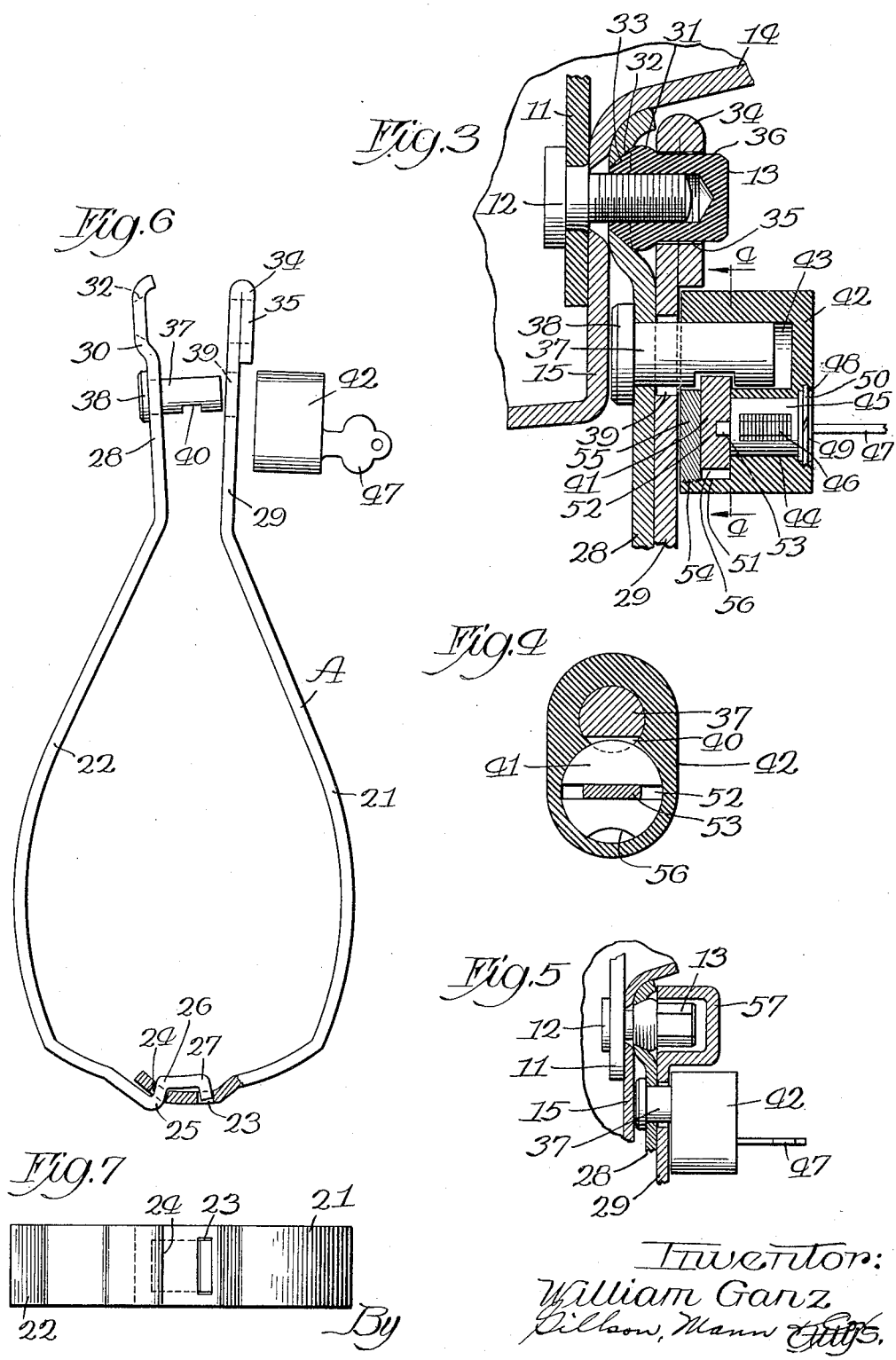

Patented Oct. 11, 1932

1,881,467

UNITED STATES PATENT OFFICE

WILLIAM GANZ, OF CHICAGO, ILLINOIS, ASSIGNOR, BY MESNE ASSIGNMENTS, TO OAKES PRODUCTS CORPORATION, OF NORTH CHICAGO, ILLINOIS, A CORPORATION OF MICHIGAN

LOCK DEVICE

Application filed December 23, 1927. Serial No. 242,131.

This invention relates to locking devices, and has for its principal specific object to prevent the theft of spare wheel parts as a whole, or the tire.

In the drawings illustrating an embodiment of the invention particularly adapted for use in connection with the Ford car.

Fig. 1 is a vertical sectional view showing a fragment of the tire carrier with a spare wheel secured thereon and locked according to this invention;

Fig. 2 is a side elevation of a fragment of the device shown in Fig. 1;

Fig. 3 is a vertical section of a fragment taken on the line 3—3 of Fig. 2;

Fig. 4 is a section taken on the line 4—4 of Fig. 3;

Fig. 5 is a section similar to Fig. 3, illustrating a modification of the means for preventing the removal of the nut;

Fig. 6 is an elevation showing an article of manufacture made in accordance with this invention, a fragment being broken away at the lower end to illustrate the joint between the two points forming the strap; and Fig. 7 is an end view looking at Fig. 6 from the bottom.

But this specific illustration and the corresponding specific description are to be considered in all respects as illustrative and not restrictive, for I realize that the invention may be embodied in other specific forms and applied to other uses without departing from its proper scope and spirit.

The spare wheel carrier includes a bracket 10, equipped with a flange 11 somewhat triangular in shape, as best illustrated in Fig. 2, and provided with three fixed studs or bolts 12, equipped with nuts 13.

The hub 14 of the wheel has an upright flange 15 at its inner end, provided with five perforations 16 to receive bolts for securing the wheel body to the inner hub part on the axle, and three of the perforations 16 are located to correspond with the three bolts 12. A rim 17, carrying a tire 18, is connected with the hub by an inner set of spokes 19, and an outer set of spokes 20.

This is the standard construction on the car mentioned, and it will be readily understood that the spare wheel body is secured to the carrier by the bolts 12 and nuts 13, and is readily removed by simply removing the nuts 13.

The specific problem presented in this instance is to prevent the removal of the wheel body as a whole, or the removal of the tire from the rim, without proper authority. It is accomplished by making use of a strap one end of which is secured by the lower bolt 12, the other end of which prevents the removal of the nut 13 on that bolt, and the intermediate portion of which forms a loop extending around the tire so as to prevent its removal from the rim.

An article of manufacture suited for this use is illustrated in Fig. 6 and generally indicated by the letter A. It is composed of two pieces 21, 22, of generally similar shape, made from bar stock and hardened. Corresponding ends of the pieces 21 and 22 are brought together and hingedly connected by providing one with perforations 23, 24, and the other with bends 25, 26 and 27, thus making them in effect form one strap. The intermediate portion of the strap is bent to form an oval-shaped loop, and the end portions 28, 29, are straight and normally lie alongside when the device is in use. The end portion 28 is slightly offset at 30 to provide a space for the accommodation of the flange 31 (Fig. 1) of the nut 13. This offset portion is provided with a tapered opening 32, complemental to the conical portion 33 on the inner end of the nut 13.

The end portion 29 is bent backwardly to form a double thickness at 34, and this double thickness is provided with a hexagonal opening 35, adapted to receive and fit the hexagonal portion 36 of the nut 13, as best illustrated in Fig. 3.

The end portion 30 carries a stud 37, pressed into a suitable perforation and provided with a head 38 at what in use becomes the back or masked side of the device. The end portion 29 is perforated at 39 to receive the stud 37, and the latter is provided with a slot 40, normally located beyond the end portion 29 and adapted to receive a rotary bolt 41 (Fig. 3) when it is desired to lock the device in place.

The bolt 41 is mounted in a casing 42, provided with a bore 43 to receive the stud 37, and another bore 44 to receive a lock plug 45, equipped with tumblers 46 adapted to be operated by a key 47. At the right, as shown in Fig. 3, the bore 44 is enlarged, at 48, to receive a flange 49 on the lock plug, and both the flange and the wall of the bore are recessed to accommodate a split ring 50 by which the plug is made fast in the casing.

At the left end, as illustrated in Fig. 3, the bore 44 is enlarged, at 51, to such a diameter that it intersects the bore 43, and it is in this enlargement that the bolt 41 is mounted to rotate under the control of the plug 45 and the key 47. The bolt has a groove 52 which receives a rib 53 on the plug, by which a driving connection is effected between the bolt and the plug. The left portion of the enlargement 51 is threaded at 54 to receive a closure 55.

The bolt 41 is cut away at 56 (Fig. 4) on the arc of a circle corresponding to the stud 37, so as to provide clearance for the stud when it is to be released.

In the use of the device the spare wheel body is put in place on the bolts 12 in the usual manner, and the two upper nuts 13 are screwed on. The loop of the strap is then opened by swinging the piece 21 about the hinge connection, and the end portion 28 is pushed over the lower bolt 12 to the position shown in Figs. 1 and 3. The nut 13 is then put on and screwed up, and the piece 21 is swung to the position shown in Figs. 1 and 3, with the hexagonal opening 35 receiving a locking nut 13 against rotation. This movement also causes the stud 37 to project through the opening 39. The lock casing 42 is then put in place and the key rotated to set the bolt in the position shown in Figs. 3 and 4, and the key removed.

Instead of providing the end portion 29 with a hexagonal opening 35, it may be provided with a cup-shaped end 57 (Fig. 5) or otherwise formed so as to mask the nut 13 and prevent the application of a wrench or other tool by which it can be turned. Such a construction has the advantage of eliminating the necessity of establishing a particular angular relation between the wrench seat on the nut and the strap.

I claim as my invention—

As an article of manufacture for the purposes described, a metal loop-shaped member adapted to straddle a tire and having two ends one over the other, one of said ends being provided with means for receiving a wheel-retaining nut, the other of said ends being provided with means for engaging the wheel retaining nut to prevent rotation of the nut relatively to the loop-shaped member.

In testimony whereof I affix my signature.

WILLIAM GANZ.